(12) United States Patent
Ajri et al.

(10) Patent No.: US 11,915,403 B2
(45) Date of Patent: *Feb. 27, 2024

(54) SYSTEM AND METHOD FOR PERFORMING QUALITY CONTROL OF MANUFACTURED MODELS

(71) Applicant: James R. Glidewell Dental Ceramics, Inc., Newport Beach, CA (US)

(72) Inventors: Abhishek Babasaheb Ajri, Lake Forest, CA (US); Vaheh Golestanian Nemagrdi, Orange, CA (US); Marco Antonio Jokada, Diamond Bar, CA (US); David Christopher Leeson, North Tustin, CA (US)

(73) Assignee: James R. Glidewell Dental Ceramics, Inc., Newport Beach, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/744,027

(22) Filed: May 13, 2022

(65) Prior Publication Data

US 2022/0277436 A1 Sep. 1, 2022

Related U.S. Application Data

(63) Continuation of application No. 16/656,445, filed on Oct. 17, 2019, now Pat. No. 11,334,977, which is a (Continued)

(51) Int. Cl.
*G06T 7/00* (2017.01)
*G06T 7/521* (2017.01)
*G06T 7/593* (2017.01)

(52) U.S. Cl.
CPC ............ *G06T 7/0002* (2013.01); *G06T 7/521* (2017.01); *G06T 7/596* (2017.01); *G06T 2207/30036* (2013.01)

(58) Field of Classification Search
CPC ....... G06T 7/0002; G06T 7/521; G06T 7/596; G06T 2207/30036
(Continued)

(56) References Cited

U.S. PATENT DOCUMENTS 5,273,429 A * 12/1993 Rekow ................... A61C 13/00
433/223
5,939,211 A * 8/1999 Mormann .......... A61C 13/0003
264/16
(Continued)

OTHER PUBLICATIONS

Pompa et al. (Comparison of Conventional Methods and Laser-Assisted Rapid Prototyping for Manufacturing Fixed Dental Prostheses: An In Vitro Study, Hindawi Publishing Corporation, 2015, pp. 1-7) (Year: 2015).*
(Continued)

*Primary Examiner* — Iftekhar A Khan
(74) *Attorney, Agent, or Firm* — Charles Fowler

(57) ABSTRACT

Disclosed herein are example embodiments of methods and systems for identifying manufacturing defects of a manufactured dentition model. One of the methods for performing quality control comprises: determining whether the manufactured dentition model is a good or a defective product based on a statistical characteristic of a differences model. The differences model can be generated based on differences between a scanned 3D patient-dentition data and a scanned 3D manufactured-dentition data. The scanned 3D patient-dentition data can be generated using 3D data of a patient's dentition, and the scanned 3D manufactured-dentition data can be generated using 3D data of the manufactured dentition model. The manufactured dentition model can be a 3D printed model.

14 Claims, 8 Drawing Sheets

Related U.S. Application Data continuation-in-part of application No. 16/457,199, filed on Jun. 28, 2019, now Pat. No. 11,210,788, which is a continuation-in-part of application No. 15/928,484, filed on Mar. 22, 2018, now Pat. No. 11,120,179.

(58) Field of Classification Search
USPC .................................................. 703/6
See application file for complete search history.

(56) References Cited

U.S. PATENT DOCUMENTS

| | | | | |
|---|---|---|---|---|
| 6,525,819 | B1* | 2/2003 | Delawter | G01J 3/50 433/29 |
| 7,708,560 | B2* | 5/2010 | Kraemer | A61C 13/0022 700/182 |
| 7,716,024 | B2* | 5/2010 | Hultgren | G06T 19/20 703/6 |
| 8,200,462 | B2* | 6/2012 | Marshall | A61C 13/0004 703/11 |
| 8,568,897 | B2* | 10/2013 | Ganley | A61C 13/0022 428/542.2 |
| 8,640,338 | B2* | 2/2014 | Jacquemyns | B23P 19/04 703/6 |
| 8,751,031 | B2* | 6/2014 | Sager | G16H 50/50 700/96 |
| 8,784,021 | B2* | 7/2014 | Luksch | A61C 13/0022 409/164 |
| 10,123,706 | B2* | 11/2018 | Elbaz | A61B 1/24 |
| 10,470,853 | B2* | 11/2019 | Leeson | A61C 13/0022 |
| 10,682,210 | B1* | 6/2020 | LaMar | A61C 13/0013 |
| 2002/0021439 | A1* | 2/2002 | Priestley | G01J 3/46 356/243.5 |
| 2003/0116299 | A1* | 6/2003 | Embert | A61C 9/0046 164/4.1 |
| 2004/0120781 | A1* | 6/2004 | Luca | A61C 13/0022 700/161 |
| 2004/0136002 | A1* | 7/2004 | Whaite | G01J 3/524 356/419 |
| 2004/0252303 | A1* | 12/2004 | Giorgianni | G01J 3/508 356/402 |
| 2005/0008887 | A1* | 1/2005 | Haymann | A61C 5/77 428/542.8 |
| 2006/0269896 | A1* | 11/2006 | Liu | G01B 11/24 433/29 |
| 2007/0026363 | A1* | 2/2007 | Lehmann | G16H 40/67 433/223 |
| 2007/0154511 | A1* | 7/2007 | Shastri | A61L 27/50 623/1.11 |
| 2007/0154866 | A1* | 7/2007 | Hall | A61C 1/084 433/213 |
| 2007/0172396 | A1* | 7/2007 | Neeper | G01N 35/0099 422/400 |
| 2007/0190481 | A1* | 8/2007 | Schmitt | A61C 9/0046 433/68 |
| 2008/0015727 | A1* | 1/2008 | Dunne | B33Y 30/00 700/118 |
| 2008/0064008 | A1* | 3/2008 | Schmitt | A61C 7/002 382/128 |
| 2008/0228303 | A1* | 9/2008 | Schmitt | A61C 19/063 700/98 |
| 2008/0241796 | A1* | 10/2008 | Ce | A61C 13/0004 433/215 |
| 2009/0133260 | A1* | 5/2009 | Durbin | A61C 13/082 29/896.11 |
| 2009/0254299 | A1* | 10/2009 | Tarazi | A61C 13/0004 702/137 |
| 2009/0258965 | A1* | 10/2009 | Lassila | A61K 6/54 523/116 |
| 2010/0105011 | A1* | 4/2010 | Karkar | A61C 13/0004 433/215 |
| 2010/0281370 | A1* | 11/2010 | Rohaly | A61C 9/0053 715/810 |
| 2011/0010187 | A1* | 1/2011 | Andersson | A61C 1/084 705/2 |
| 2011/0050848 | A1* | 3/2011 | Rohaly | G06T 15/10 348/43 |
| 2011/0306017 | A1* | 12/2011 | Tanaka | C04B 41/85 433/203.1 |
| 2012/0308954 | A1* | 12/2012 | Dunne | A61C 13/34 700/98 |
| 2013/0174639 | A1* | 7/2013 | Earthman | A61B 9/00 367/189 |
| 2013/0289950 | A1* | 10/2013 | Kopelman | A61C 8/0001 703/1 |
| 2014/0308624 | A1* | 10/2014 | Lee | A61C 13/0004 433/214 |
| 2015/0086939 | A1* | 3/2015 | Fisker | A61C 9/004 433/29 |
| 2015/0147585 | A1* | 5/2015 | Schwarze | B29C 64/153 219/76.14 |
| 2015/0150655 | A1* | 6/2015 | Frank | A61B 5/0035 433/29 |
| 2015/0151858 | A1* | 6/2015 | Turzi | A61L 27/54 141/59 |
| 2015/0250568 | A1* | 9/2015 | Fisker | A61C 13/081 433/29 |
| 2015/0332018 | A1* | 11/2015 | Rosen | G16H 10/40 705/2 |
| 2016/0100917 | A1* | 4/2016 | Howe | A61C 13/0004 264/16 |
| 2016/0147976 | A1* | 5/2016 | Jain | G16H 20/10 705/2 |
| 2017/0000591 | A1* | 1/2017 | Guillot | A61B 5/0013 |
| 2017/0156828 | A1* | 6/2017 | Leeson | A61C 13/0022 |
| 2017/0265978 | A1* | 9/2017 | Borotto | A61C 19/05 |
| 2017/0340419 | A1* | 11/2017 | Ohtake | A61C 13/0004 |
| 2017/0345147 | A1* | 11/2017 | Ohtake | G06T 7/75 |
| 2018/0028413 | A1* | 2/2018 | Craig | A61K 6/17 |
| 2018/0206951 | A1* | 7/2018 | O'Neill | A61C 9/004 |
| 2019/0126306 | A1* | 5/2019 | Bakhshaei | B05B 15/55 |
| 2019/0130596 | A1* | 5/2019 | Manafighazani | G06Q 10/087 |
| 2019/0294743 | A1* | 9/2019 | Ajri | A61C 13/0004 |
| 2019/0318479 | A1* | 10/2019 | Ajri | A61C 9/0093 |
| 2022/0108453 | A1 | 4/2022 | Ajiri et al. | |

OTHER PUBLICATIONS

Pompa et al. ("Comparison of Conventional Methods and Laser-Assisted Rapid Prototyping for Manufacturing Fixed Dental Prostheses: An in Vitro Study", Biomed Research International, 2015, pp. 1-2).

Gary L. Henkel ("A Comparison of Fixed Prostheses Generated from Conventional vs. Digitally Scanned Dental Impressions", Private Practice, Horsham, Pennsylvania, 2007, pp. 1-8).

Maria Averyanova (Quality Control of Dental Bridges and Removable Prostheses Manufactured Using Phenix Systems Equipment, AEPR 12, 17th European Forum on rapid Prototyping and Manufacturing Paris, France, Jun. 12-14, 2012).

* cited by examiner

SYSTEM AND METHOD FOR PERFORMING QUALITY CONTROL OF MANUFACTURED MODELS

CROSS-REFERENCE TO RELATED APPLICATIONS

This application is a continuation patent application of U.S. patent application Ser. No. 16/656,445, filed Oct. 27, 2019, which is a continuation-in-part patent application of U.S. patent application Ser. No. 16/457,199, filed Jun. 28, 2019, now U.S. Pat. No. 11,210,788, which is a continuation-in-part patent application of U.S. patent application Ser. No. 15/928,484, filed Mar. 22, 2018, now U.S. Pat. No. 11,120,179, the disclosures of each of the foregoing applications are incorporated herein by reference in its entireties for all purposes.

TECHNICAL FIELD

The disclosure relates generally to the field of quality control, specifically and not by way of limitation, some embodiments are related to automatically performing quality control on manufactured dental prostheses.

BACKGROUND

Recently, CAD/CAM dentistry (Computer-Aided Design and Computer-Aided Manufacturing in dentistry) has provided a broad range of dental restorations, including crowns, veneers, inlays and onlays, fixed bridges, dental implant restorations, orthodontic appliances, and dentition models of a patient's dentition. In a typical CAD/CAM based dental procedure, a treating dentist can prepare the tooth being restored either as a crown, inlay, onlay, or veneer. The prepared tooth and its surroundings are then scanned by a three-dimensional (3D) imaging camera and uploaded to a computer for design. Alternatively, a dentist can obtain an impression of the tooth to be restored and the impression may be scanned directly, or formed into a model to be scanned, and uploaded to a computer for design.

Dental prostheses are typically manufactured at specialized dental laboratories that employ computer-aided design (CAD) and computer-aided manufacturing (CAM) milling systems to produce dental prostheses according to patient-specific specifications provided by dentists. In a typical workflow, information about the oral situation of a patient is received from a dentist, and the dentist or dental laboratory can design the dental prosthesis, which is milled from a block of material.

After the milling process, the milled material blocks are cleaned. Next, the blocks are manually inspected prior to being transferred to a sintering tray for the sintering process. Once the dental prosthesis is sintered, glazed, cleaned, and inspected, it can be delivered to the dentist.

Today, most dentists expect the newly manufactured dental prosthesis to be shipped with a dentition model of the patient for which the dental prosthesis was designed. This enables the dentist to test how the dental prosthesis would look and fit on the manufactured (e.g., tangible) dentition model that was generated using the patient's 3D dentition data. Some dentists even come to rely on the manufactured dentition model as the final quality checking process. For example, some dentists would send back the dental prosthesis if it does not fit well with the manufactured dentition model. Accordingly, designing and manufacturing an accurate manufactured dentition model is important to prevent false defect rejections of a dental prosthesis.

SUMMARY

Disclosed are example embodiments of methods and systems for identifying and quantifying manufacturing defects of a manufactured dentition model. One of the methods for performing quality control comprises: determining whether the manufactured dentition model is a good or a defective product based on a statistical characteristic of a differences model.

The differences model can be generated based on differences between a scanned 3D patient-dentition data and a scanned 3D manufactured-dentition data. The scanned 3D patient-dentition data can be generated using 3D data of a patient's dentition, and the scanned 3D manufactured-dentition data can be generated using 3D data of the manufactured dentition model. The manufactured dentition model can be a 3D printed model.

In some embodiments, the differences model can be generated using only data corresponding to a tooth. That is data from both the scanned 3D patient-dentition data and the scanned 3D manufactured-dentition data that do not correspond to a tooth or tooth site are excluded. The differences model can also exclude data that correspond to an artificial dentition fixture, which is a structure of the manufactured dentition model that is not associated with teeth and gum structures. The artificial dentition fixture of a manufactured dentition model can include a base and a hinge. The base supports the hinge, one or more tooth structures, and gum structures. The hinge is configured to be pivotably attached to an opposing manufactured dentition model that is configured to simulate a bite when mated with the manufactured dentition model.

The manufactured dentition model can have a recess between a pair of tooth structures. The recess can be introduced by modifying the data of the scanned 3D patient-dentition data. Using a 3D modeling software, the scanned 3D patient-dentition data can be viewed and edited in 3D. Here, one or more slots (e.g., ditch) can be added at the gum area between two teeth or tooth structures. The slot can extend beyond from where the gum line starts to a predetermined depth, which can have a range between 5% to 75% of a total thickness of gum (at the same location). In some embodiments, the predetermined depth has a range of 45% of the total thickness of the gum between the pair of tooth structures.

In some embodiments, the manufactured dentition model is considered to be a good part when all offsets within ±50 microns account for greater than 85% of all points in the differences model. Similarly, the manufactured dentition model is considered to be a good part when all offsets within ±50 microns account for greater than 85% of all points in the differences model and all offsets greater than ±75 microns account for less than 1% of all points in the differences model. The manufactured dentition model is considered to be too small or too large when a distribution of differences is negatively or positively biased as compared to a normal distribution.

One of the systems for performing quality control on a manufactured dentition model comprises: a quality control module configured to determine whether the manufactured dentition model is a good or a defective product based at least on a statistical characteristic of a differences model, wherein the differences model comprises differences between a scanned 3D patient-dentition data and a scanned 3D manufactured-dentition data. The scanned 3D patient-dentition data comprises 3D data of a patient's dentition, and the scanned 3D manufactured-dentition data comprises 3D data of the manufactured dentition model.

In yet another embodiment, a second method for performing quality control on a 3D-printed dentition model comprises: obtaining a scanned 3D dentition data of dentition of a patient; printing the 3D-printed dentition model using the scanned 3D dentition data; generating a differences model by comparing the scanned 3D dentition data of the patient and a scanned 3D manufactured-dentition data generated by scanning the manufactured dentition model; and determining whether the 3D-printed dentition model is a good or a defective product based on a statistical characteristic of a differences model.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes and may not have been selected to delineate or circumscribe the disclosed subject matter.

BRIEF DESCRIPTION OF THE DRAWINGS

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Figure 1:
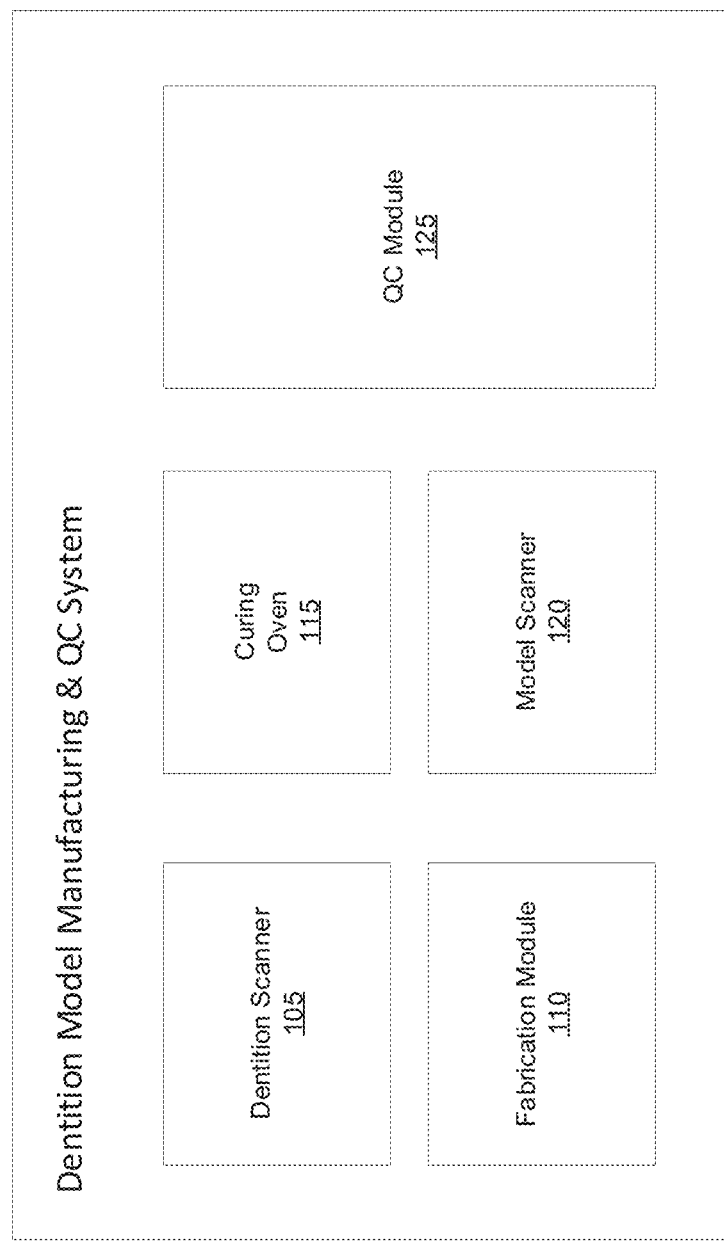
FIG. 1 is a high-level block diagram of manufacturing and quality control system in accordance with some embodiments of the present disclosure.

In the following description, for purposes of explanation, numerous specific details are set forth to provide a thorough understanding of the invention. However, it will be apparent to one skilled in the art that the invention can be practiced without these specific details. In other instances, structures and devices are shown in a block diagram form in order to avoid obscuring the invention.

Overview

A patient's dentition data set can include one or more of the patient's scan data from multiple and/or duplicative scans of various portions of the patient's mouth. For example, each scan data can be a scan of one or more portions of the patient's jaw. The manufactured dentition model described herein can be fabricated using 3D data (e.g., electronic image) of at least a portion of a patient's dentition. A patient's scanned dentition data (also referred to as scanned 3D patient-dentition data) can be obtained by a direct intraoral scan of the patient's teeth. It could also be obtained indirectly in several ways, such as, by scanning an impression of the patient's teeth, by scanning a physical model of the patient's teeth, or by other methods known to those skilled in the art. Using the scanned 3D patient-dentition data, a computer-implemented model manufacturing system can create a physical model of the patient's dentition, which can be used by dentists to test the "look" and "feel" of a dental prosthesis.

To generate the scanned 3D patient-dentition data, one or more scans can be performed on the patient's teeth, depending upon where the dental prosthesis is to be installed. For example, an occlusal, a lingual, and a buccal scan can be performed on both the preparation and the opposing jaws. For example, a single scan with the jaws in occlusion can be taken from the buccal perspective to establish the proper occlusion relationship between the preparation jaw and the opposing jaw. Additionally, in some embodiments, inter-proximal scans are added to capture the contact areas of neighboring teeth. Once the scanning process is completed, a scanning system (not shown) will assemble the plurality of scans into a merged digital model—forming the scanned 3D patient-dentition data.

The scanned patient-dentition data can then be used to manufacture dentition model using a lathing and milling system or a 3D printing system. In some embodiments, where a 3D printer is used to create the manufactured dentition model, the thickness of each layer being deposited can range between 25-125 microns. For example, the layer thickness can also be between 45-80 microns. In some embodiments, the layer thickness is 50 microns. The materials used by the 3D printer to create the manufactured dentition model can be plastics (e.g., ABS plastic, polyurethane, acrylic esters) nylon, metals, or metal alloys. In some embodiments, medical grade thermal plastics are used because they are easy to handle, and the printing time is faster than that of metal. In some embodiments, the 3D printing material used is a medical grade acrylic esters.

As alluded to above, once the scanned patient-dentition data is obtained, it is used to fabricate a 3D printed model (i.e., the manufactured dentition model) that will be eventually shipped to the dentist. Once printed, the manufactured dentition model can be cured using a curing oven to permanently set the material or to obtain temperature stability.

The curing process is carefully controlled. Each curing oven can have different curing profiles for different materials. For example, a thermal plastic from company A can have a different curing profile than the curing profile of a thermal plastic from company B. The curing profile for each type of curing oven and material can be developed through experimentations.

After the manufactured dentition model is cured, it can be scanned using a 3D scanner that is specifically set up to scan the manufactured dentition model. In some embodiments, the manufactured dentition model is modified to include features in the scanned patient-dentition data and additional dentition fixtures such as, but not limited to, a base and a hinge. The base can have different shapes such as a square or a rectangle. The base provides a foundation on which dentition features from the scanned patient-dentition data are manufactured. Examples dentition features are teeth, crown preparation site (e.g., a prep tooth), gum line, individual tooth surface anatomy and size, gum features, and other dental features. Examples of tooth surface anatomy features are buccal and lingual cusps, occlusal surface, and buccal and lingual arcs.

The base also provides the foundation for the hinge to be printed. The hinge can be used to pivotably couple an opposing manufactured dentition model to simulate bites of both the upper and lower jaw. However, during the quality control process, the hinge and the foundation are excluded from the quality analysis because they are structures unrelated to the performance and quality of a dental prosthesis.

Next, the manufactured dentition model is scanned to generate another set of 3D data—the scanned 3D manufactured-dentition data. This dataset and the scanned 3D patient-dentition data are then used to generate a differences model upon which quality control is performed. Since dentists commonly rely on the manufactured dentition model to test the quality of a dental prosthesis, it becomes important to provide dentists with a highly accurate manufactured dentition model.

Quality Control System

FIG. 1 illustrates a dentition model manufacturing and QC system 100 in accordance with some embodiments of the present disclosure. System 100 includes a dentition scanner 105, a fabrication module 110, a curing oven 115, a model scanner 120, and a QC module 125. Dentition scanner 105 can be an intraoral scanner that scan a patient's dentition directly. Alternatively, dentition scanner 105 can be an impression scanner. In this scenario, an impression of the patient's dentition can be made using an impression material. The impression can then be scanned with dentition scanner 105. One or more impressions can be taken, and one or more scans can be performed on each impression. Using a best-fitting algorithm, data from one or more scans can be combined to create a merged patient's dentition data set.

Fabrication module 110 can fabricate a manufactured dentition model using the data from dentition scanner 105. Fabrication module 110 can be an injection molding system, a lathing and milling system, or a 3D printing system. In some embodiments, fabrication module 110 is a 3D printing system. For example, fabrication module 110 can be a 3D printing system such as a stereolithography (SLA) 3D printer or a digital light processing (DLP) 3D printer. The 3D printing material used can be a photopolymer, methacrylate based polymer, ester based polymer, ABS plastic, thermal plastic, acrylic esters, or a medical grade plastic.

Figures 2A, 2B:
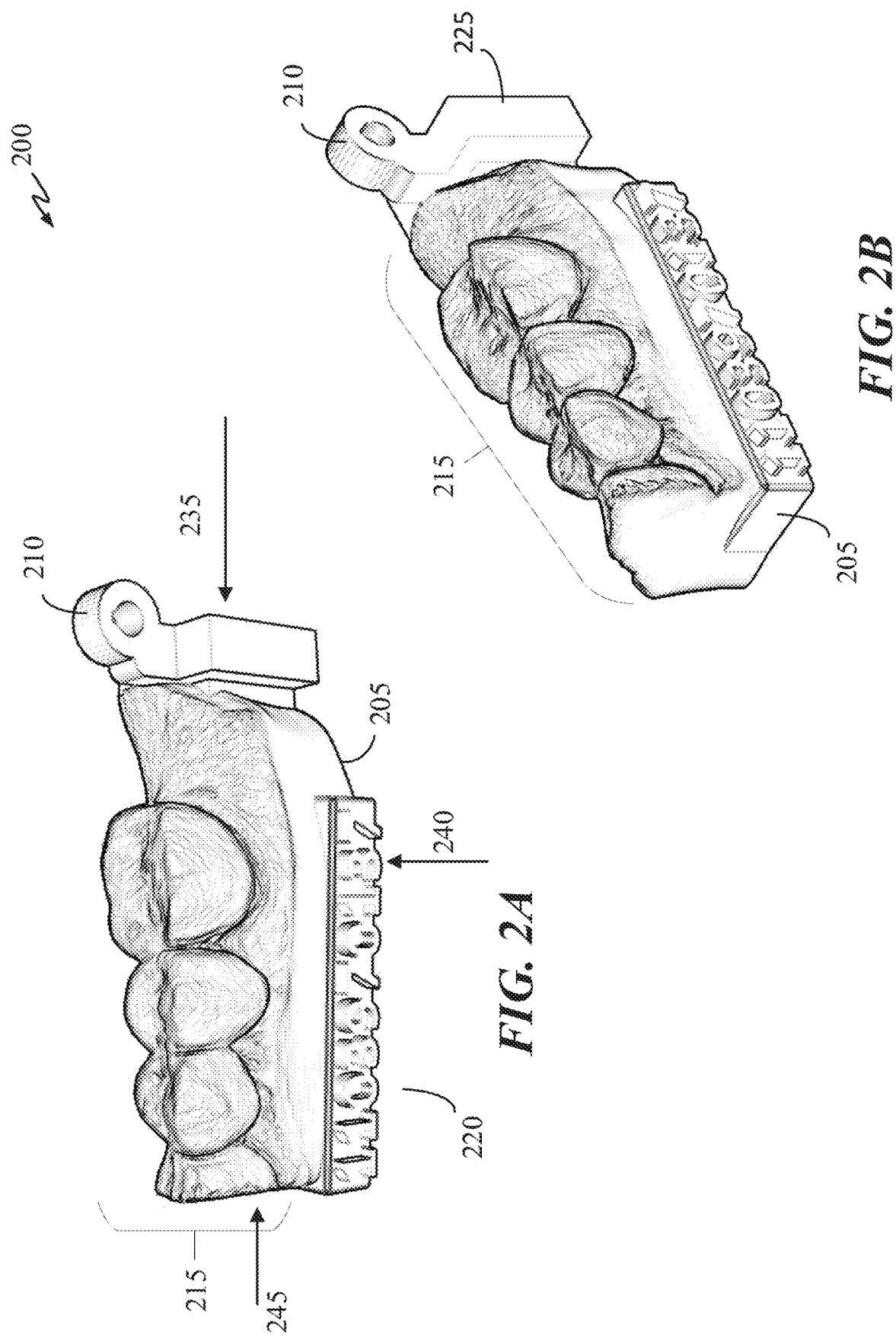
FIGS. 2A, 2B, and 2C are various perspective views of a manufactured dentition model.
Figure 2C:

Fabrication module 110 can be configured to deposit a layer of material having a thickness range from 25 microns to 125 microns. A low thickness layer such as 20 microns would yield very detailed and accurate in the manufactured dentition model. However, the time it would take to complete the printing process might be too long for full production. In contrast, a high layer thickness such as 150 microns would yield a less accurate dentition model, but it would be much faster to produce. The layer thickness can depend on the material and the type of 3D printer used. In some embodiments, the optimum layer thickness has a range from 45 to 65 microns. FIGS. 2A-C will now be discussed in concurrent with FIG. 1

FIGS. 2A-C illustrate a manufactured dentition model 200 in accordance with some embodiments of the present disclosure. Dentition model 200 includes a base 205, a hinge 210, and dentition features area 215. Base 205 provides a foundation for dentition features area 215 to be fabricated. Base 205 also supports hinge 210, which is configured to be pivotably attached to a corresponding opposing dentition model. For example, dentition model 200 can be a portion of the lower jaw. Accordingly, the corresponding opposing dentition model is the portion of the upper jaw that forms a bite with dentition model 200. Dentition features area 215 can include one or more teeth, one or more prep sites, and gums. Dentition model 200 can also include identification area 220 that contain identifying information of the dentition model and/or the dental prosthesis for which dentition model 200 was made. An identifying information can also be created on side wall 225 of dentition model 200. In some embodiment, the identifying information can be a barcode, QR code, or numbers.

Figure 3:
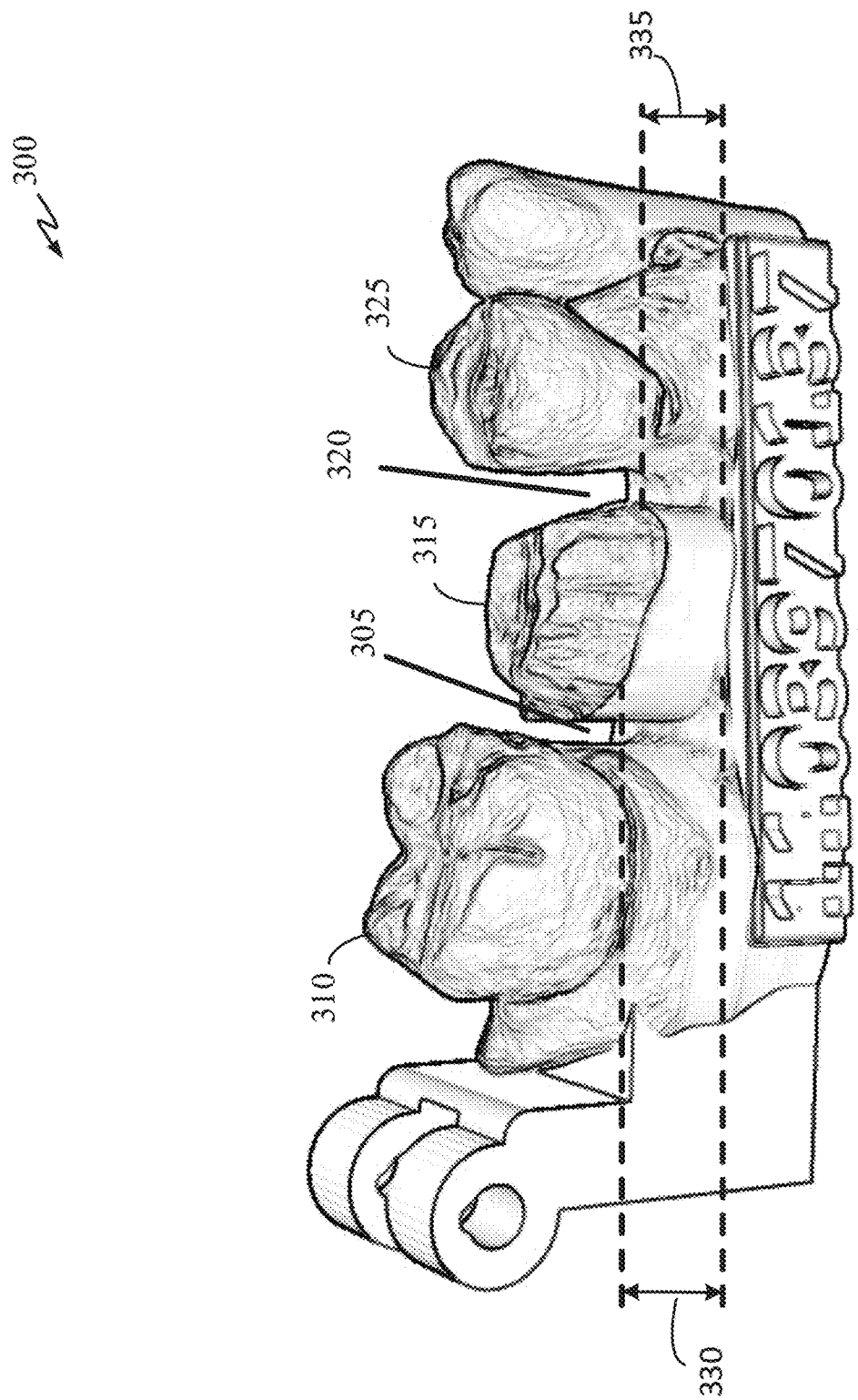
FIG. 3 illustrates a manufactured dentition model in accordance with some embodiments of the present disclosure.

FIG. 3 illustrates a manufactured dentition model 300 fabricated in accordance with some embodiments of the present disclosure. Dentition model 300 is similar to dentition model 200 and can include one or more features of dentition model 200 as described above. The main distinction of dentition model 300 is the recesses (e.g., ditch) formed between two teeth or tooth structures. As shown, recess 305 is between tooth 310 and prepped tooth 315. Recess 320 is formed between prepped tooth 315 and tooth 325. Both recesses are artificial—not a natural dentition feature. In some embodiments, recesses 305 and 320 can be created by modifying the scanned 3D patient-dentition data so that the recesses are created during the printing process. Recesses 305 and 320 can also be created after the 3D printing process using post processing procedures such as milling.

Recesses 305 and 320 are considered to be a full recess—the depth of the recess is substantially equal to the gum thickness at that location. As shown in FIG. 3, recesses 305 and 320 almost reach the base of dentition model 300. In some embodiments, recesses 305 and 320 are partial recesses, which means the depth of each recess is a fraction of the gum thickness. For example, the depth of recess 305 can be half of the total gum thickness 330. In another example, the depth of recess 305 can be 45% of the total gum thickness. Similarly, the depth of recess 320 can be 35-75% of thickness 335. In yet another example, the depth of recesses 305 and/or 320 can range from 0.05-1 mm. For instance, the depth of recesses 305 and/or 320 can be 0.1 mm. A partial recessed model can provide sufficient relief of the soft tissue (e.g., gum) in the scan so that a dental prosthesis can sit on the margin and be visible for inspection. A fully recessed model can introduce warpage to the model once it is cured. Accordingly, a partial recessed model provides the benefits of both the non-recessed and full-recessed model. Partially recessed models can be advantageous because they easier to print while still maintaining structural integrity of a non-recessed model (no warpage) while providing sufficient room for a dental prosthesis to be mounted for testing.

Certain 3D printing material needs to be cured before the material become stable and can be handled without causing damage to the part. Curing oven 115 can have a predetermined curing profile based at least on the type of 3D printer and the type of 3D printing material used to fabricate dentition model 200. For example, the temperature ramp rate and curing time can vary depending upon the material used. In another example, the temperature ramp rate and hold time can fluctuate and change every number of minutes or hours.

Once dentition model 200 is cured, it can be scanned to create a 3D data of dentition model 200. Model scanner 120 can be a contact or non-contact inspection device that can generate a scanned data set of the manufactured dentition model. The scanned data model can be a 3D model or 2D calibrated model. Scanner 120 can use light or radio waves to scan the manufactured dentition model. Scanner 120 can generate a 3D data set of the scanned dental prosthesis in a stereolithography CAD format known as STL. Scanner 120 can also generate other types of 3D data set format such as 3DS, BLEN, SCL, and SKP. In some embodiments, scanner 120 can scan a dental prosthesis and generate a 2D calibrated image. To generate the 3D data set, scanner 110 can use 3D scanning technology such as, but not limited to, laser triangulation, structured light, laser profilometer, focus variation, OCT, conoscopic holography, confocal microscopy, contact measurement, and photogrammetry.

Model scanner 120 can include a holder (not shown) that can be rotated 360 degrees and can be translated in one or more directions (e.g., x, y, and z directions). The holder is configured to hold and secure the manufactured dentition model (e.g., dentition model 200) while it is being scanned. The holder also includes a controller that can rotate and move the manufactured dentition model (while it is being held by the holder) based on a scanning profile, which specifies the rate and direction of rotations, the rate and direction of translations, the tilt angle, the number of cycles, and the hold rate after each rotation, translation, and/or tilt motion. The tilt angle is an angle in which the holder tilts the manufactured dentition model. A tilt angle of 0° means there is zero tilt and that the dentition model is parallel with respect to the ground. A tilt angle of 90° would cause the dentition model to be approximately perpendicular to the ground.

When scanning, model scanner 120 can rotate, tilt and/or translate the manufactured dentition model such that sharp edges on the manufactured dentition model are not perpendicular to the incident light. In other words, the manufactured dentition model is moved (a combination of rotation, translation and titling) such that sharp edges are not at 90° degrees with respect to the scanner's light source. For example (referring to FIG. 2A), model scanner 120 can scan dentition model 200 at many directions and angles except starting from hinge side (posterior) 235, base side 240, or anterior side 245. For other areas of the manufactured dentition model, model scanner 120 is configured to rotate, tilt and/or translate the manufactured dentition model such that most (substantially all) of the dentition features of are perpendicular to the incident light.

TABLE 1

| Sequence | Rotation Angle | Tilt Angle | Scanning portion |
|---|---|---|---|
| 1 | 0 | 90 | Occlusal |
| 2 | 60 | 90 | |
| 3 | 120 | 90 | |
| 4 | 180 | 90 | |
| 5 | 240 | 90 | |
| 6 | 300 | 90 | |
| 7 | 300 | 0 | Periphery |
| 8 | 240 | 0 | |
| 9 | 180 | 0 | |
| 10 | 120 | 0 | |
| 11 | 60 | 0 | |
| 12 | 0 | 0 | |
| 13 | 45 | 0 | Detail scan of Crevices |
| 14 | 45 | 20 | |
| 15 | 45 | 40 | |
| 16 | 45 | 60 | |
| 17 | 45 | 80 | |
| 18 | 135 | 80 | |

TABLE 1-continued

| Sequence | Rotation Angle | Tilt Angle | Scanning portion |
|---|---|---|---|
| 19 | 135 | 60 | |
| 20 | 135 | 40 | |
| 21 | 135 | 20 | |
| 22 | 135 | 0 | |
| 23 | 225 | 0 | |
| 24 | 225 | 20 | |
| 25 | 225 | 40 | |
| 26 | 225 | 60 | |
| 27 | 225 | 80 | |
| 28 | 315 | 80 | |
| 29 | 315 | 60 | |
| 30 | 315 | 40 | |
| 31 | 315 | 20 | |
| 32 | 315 | 0 | |

In some embodiments, model scanner 120 can have a scanning profile as specified in Table 1. For each rotation and tilt angle setting, model scanner 120 can scan the manufactured dentition model by moving (e.g., translating, rotating) the scanning head and/or light source(s) or by translating the holder. Each row of Table 1 can represent a scanning sequence. Model scanner 120 can perform one or more sequences of scanning for each row. After a sequence is completed, the next setting (next row) is performed until the entire scanning cycle (all rows) is completed.

Each scanning sequence can scan one or more portions of the manufactured dentition model. For example, the occlusal and/or periphery portions of the manufactured dentition model can be scanned during one or more sequences. In some embodiments, only one portion of the manufactured dentition model is scanned during a sequence. Alternatively, one portion of the manufactured dentition model can be repeatedly scanned over multiple sequences. For example, as shown in Table 1, the occlusal portion of the manufactured dentition model can be scanned in sequences 1 through 6. The periphery portion of the manufactured dentition model can be scanned in sequences 7 through 12. Finally, the crevices portions of the manufactured dentition model can be scanned in sequences 13 through 32.

QC module 125 can include a data preprocessing module (not shown) configured to pre-process each 3D data set. There are two 3D data sets that are used to generate the differences model, on which quality control will be based. The two 3D data sets are the scanned 3D patient-dentition data and the scanned 3D manufactured-dentition data. Data preprocessing can be necessary to trim unwanted data that could otherwise inject errors into the differences model. For example, data points corresponding to the roof of the mouth or untreated area of the jaw can be removed from the scanned 3D patient-dentition data. Data points corresponding to the base, the hinge, and recesses in the scanned 3D manufactured-dentition data can also be omitted. If these data from these regions are not omitted, they could negatively affect the best-fitting algorithm and thereby lead to false negative errors. For example, in generating the differences model, data points from recesses 305 and 320 can be omitted.

In some embodiments, data for the differences model only include data points that correspond to a tooth or a prepped site. For example, only data relating to tooth 310, 315, and 325 will be used to generate the differences model. Any data relating to recesses 305 and 320, the base, or the hinge can be omitted.

The data preprocessing module can be an integrated component of QC module 125 or it can be an independent module that can be called (via an application programming interface). The data preprocessing module can include dentition modeling software and graphical user interfaces (GUI) that enable a user to select and modify various locations on the differences model.

QC module 125 can determine whether the manufactured dentition model is a good or defective part based on the distribution of offsets of the differences model, which can comprise of data points of offset values. An offset is determined by the difference in distance between a point in the scanned 3D patient-dentition data and the corresponding best-fitting point in the scanned 3D manufactured-dentition data. For a perfect match, the offset value is zero.

For example, in a good part, the distribution of all offset values of the difference model is similar to a normal distribution. In a defective part, the distribution of the offsets is biased in the negative or positive direction, or it could have two or more peaks. A negative direction is toward the negative side from the center of the normal distribution. Alternatively, a defective part can have a distribution with one or more peaks in the negative or positive direction. In this way, QC module 125 can determine whether the manufactured dentition model is good or bad.

In some embodiments, QC module 125 can determine whether the manufactured dentition model is a good or defective part based on the distribution of offsets of the differences model, which can comprise of data points of offset values. QC module 125 can also provide feedback to the 3D printer and/or the curing oven, based at least on the differences model, so that various manufacturing processes (e.g., layer thickness, temperature profile) of the 3D printer and/or the curing oven can be adjusted. In this way, a feedback loop can be established so that subsequent productions of the dentition model can have better quality.

Figure 4:
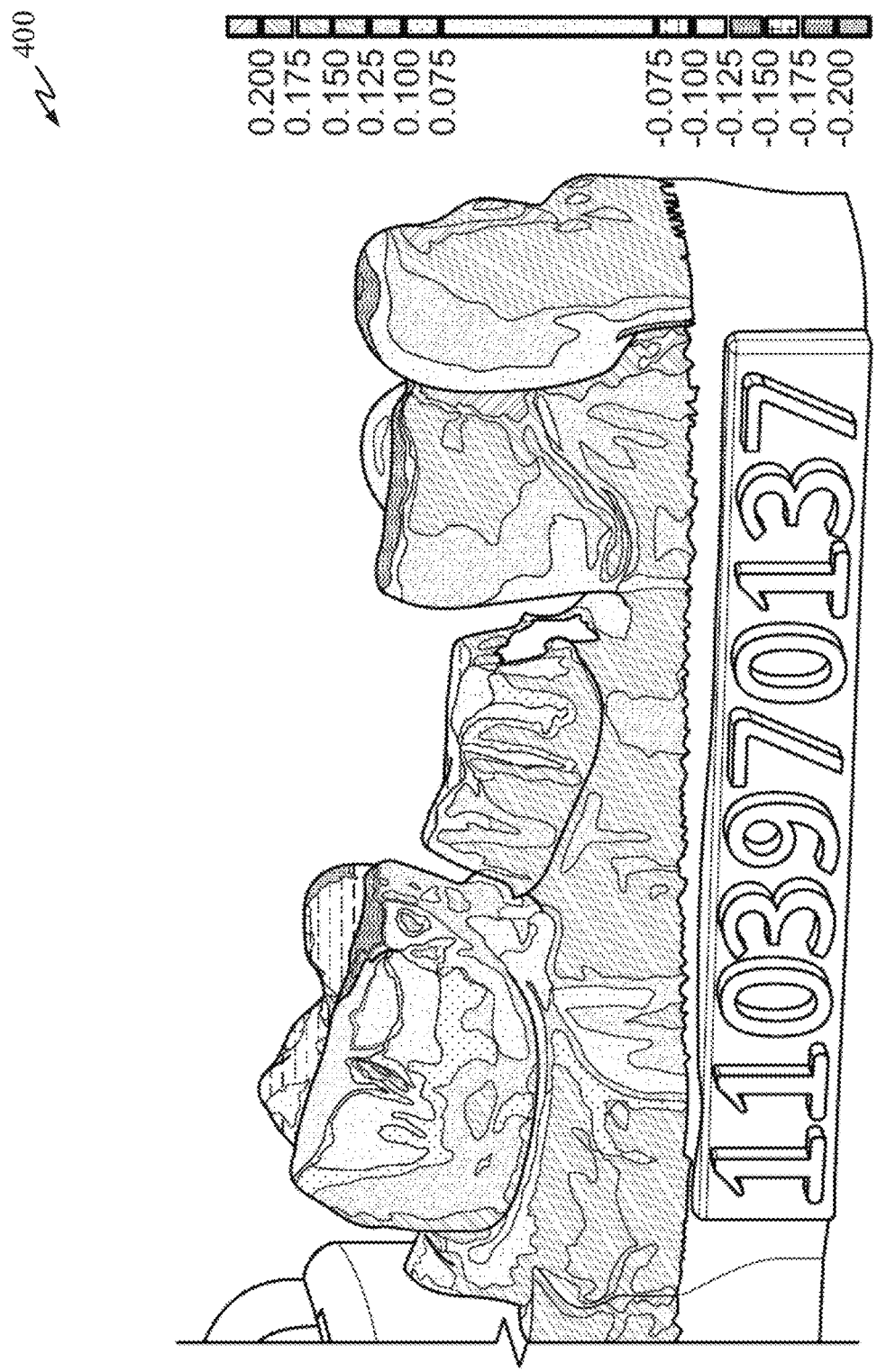
FIG. 4 illustrates a differences model of a bad part in accordance with some embodiments of the present disclosure.

FIG. 4 illustrates a differences model 400 of a bad manufactured dentition model. In some embodiments, QC module 125 can flag a manufactured dentition model as a bad part when over 10% of the offsets are over ±75 microns. In some embodiments, a part can be considered bad when over 30% of the offsets are over ±75 microns. In some embodiments, only offsets of data corresponding to an area of a tooth or prepped site are included in the statistical analysis. For example, data corresponding to gum areas below the gumline are excluded. Alternatively, all data points except data points corresponding to the base and the hinge can be included in the statistical analysis.

Alternatively, QC module 125 can flag a manufactured dentition model as a bad part when over 15% of the offsets are over ±50 microns. Inversely, QC module 125 can flag a manufactured dentition model as a good part when over 85% of the offsets are within ±50 microns. In one embodiment, QC module 125 can flag a manufactured dentition model as a good part when over 85% of the offsets are within ±75 microns.

Figure 5:
FIG. 5 illustrates a differences model of a good part in accordance with some embodiments of the present disclosure.

FIG. 5 illustrates a differences model 500 of a good manufactured dentition model. QC module 125 can flag a manufactured dentition model as a good part when all offsets within ±50 microns account for greater than 85% of all points in the differences model and all offsets greater than ±75 microns account for less than 1% of all points in the differences model.

Figure 6:
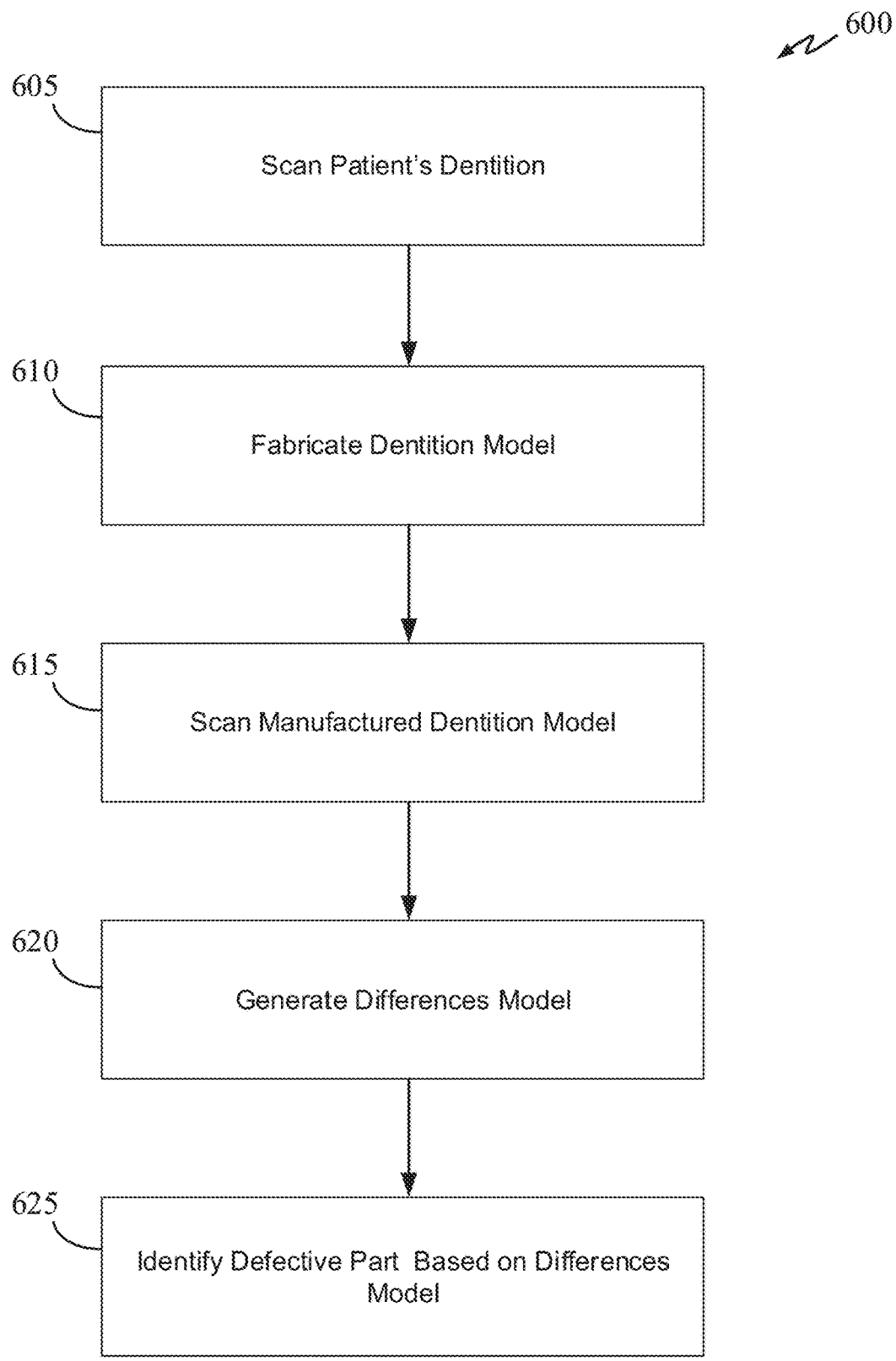
FIG. 6 is a flow chart of a QC process in accordance with some embodiments of the present disclosure.

FIG. 6 is a flow chart of an auto QC process 600 in accordance with some embodiments of the present disclosure. Process 600 starts at 605 where a scan of a patient's dentition is made using an intraoral 3D scanner. Alternatively, an impression of the patient's dentition can be made and then the impression can be scanned to generate a 3D dentition data set. In some embodiments, modification to the scanned 3D patient-dentition data can be made. For example, the base, hinge and recesses could be added to the data set. Additionally, extraneous data such as unwanted portion of the jaw (e.g., extra teeth data, tongue, roof of the mouth) that were included in the scan can be deleted.

At 610, using a 3D printer, a manufactured dentition model can be fabricated using the scanned 3D patient-dentition data or the modified scanned 3D patient-dentition data (e.g., modified dataset to include the base, hinge, and one or more recesses). At 615, the manufactured dentition model is scanned to generate the scanned 3D manufactured-dentition data.

At 620, a best-fitting algorithm is performed on the scanned 3D patient-dentition data and the scanned 3D manufactured-dentition data to generate a differences model. Each data point in the differences model can have an offset value. An offset value of zero means the data points in both data set matches perfectly. If the match is not perfect, an offset value will be registered. For example, if an offset between two corresponding points is 50 microns, then the offset value for the data point of the differences model is 50 microns.

At 625, a manufactured dentition model can be identified as a good or bad part based at least on a statistical analysis of the differences model. For example, if the distribution has only one peak and is a normal distribution, and the standard deviation is below a certain threshold, then the part can be considered to be good. Inversely, if the standard deviation of all the data points exceed a certain value, then the part can be considered to be bad.

Figure 7:
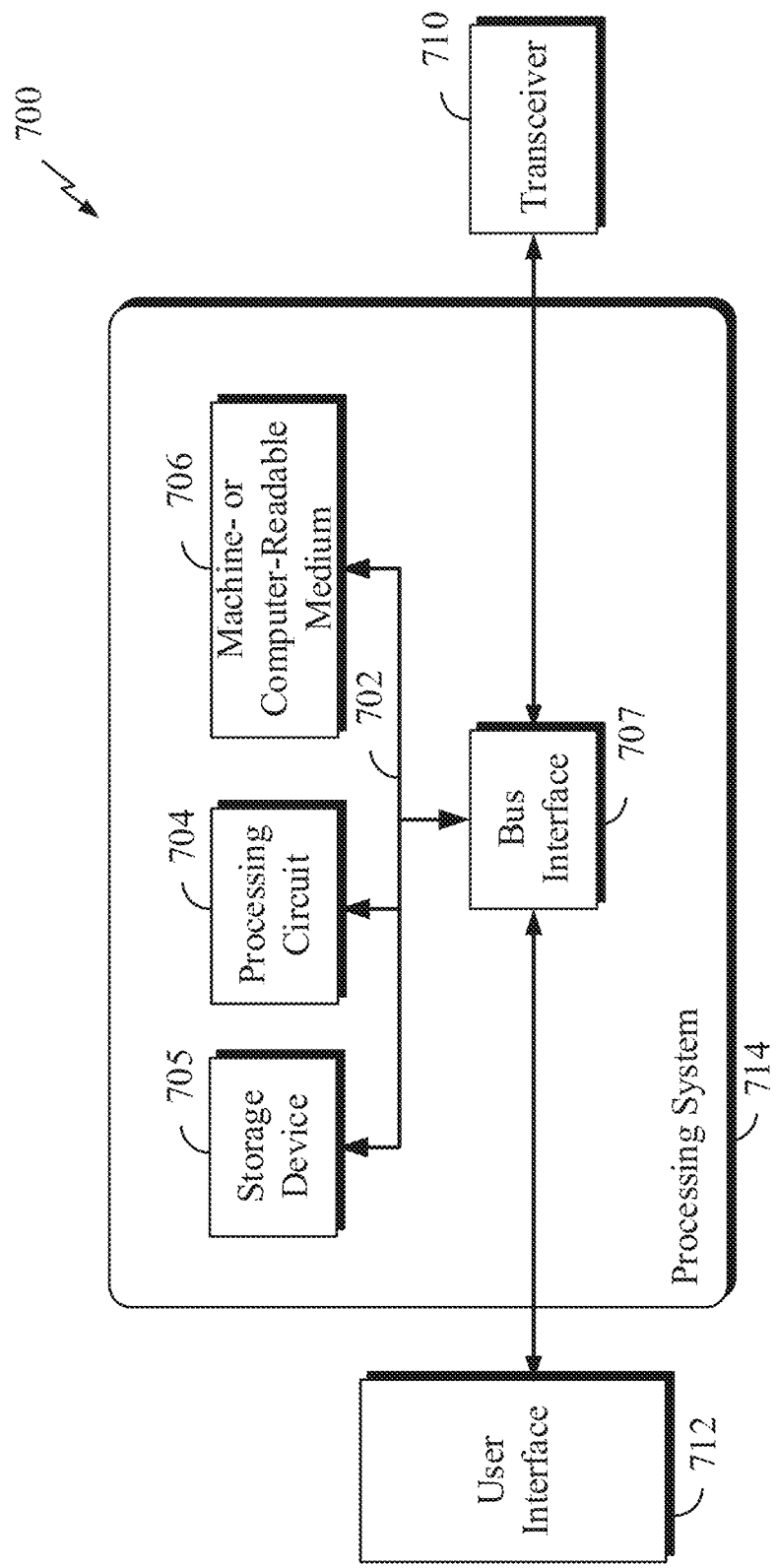
FIG. 7 is a system diagram that can be used to implement the system and method for performing quality control in accordance with some embodiments of the present disclosure.

FIG. 7 illustrates an overall system or apparatus 700 in which system 100 and process 600 can be implemented. In accordance with various aspects of the disclosure, an element, or any portion of an element, or any combination of elements may be implemented with a processing system 714 that includes one or more processing circuits 704. Processing circuits 704 may include micro-processing circuits, microcontrollers, digital signal processing circuits (DSPs), field programmable gate arrays (FPGAs), programmable logic devices (PLDs), state machines, gated logic, discrete hardware circuits, and other suitable hardware configured to perform the various functionality described throughout this disclosure. That is, the processing circuit 704 may be used to implement any one or more of the processes described above and illustrated in FIGS. 4 through 12.

In the example of FIG. 7, the processing system 714 may be implemented with a bus architecture, represented generally by the bus 702. The bus 702 may include any number of interconnecting buses and bridges depending on the specific application of the processing system 714 and the overall design constraints. The bus 702 links various circuits including one or more processing circuits (represented generally by the processing circuit 704), the storage device 705, and a machine-readable, processor-readable, processing circuit-readable or computer-readable media (represented generally by a non-transitory machine-readable medium 706.) The bus 702 may also link various other circuits such as timing sources, peripherals, voltage regulators, and power management circuits, which are well known in the art, and therefore, will not be described any further. The bus interface 707 provides an interface between bus 702 and a transceiver 710. The transceiver 710 provides a means for communicating with various other apparatus over a transmission medium. Depending upon the nature of the apparatus, a user interface 712 (e.g., keypad, display, speaker, microphone, touchscreen, motion sensor) may also be provided.

The processing circuit 704 is responsible for managing the bus 702 and for general processing, including the execution of software stored on the machine-readable medium 706. The software, when executed by processing circuit 704, causes processing system 714 to perform the various functions described herein for any particular apparatus. Machine-readable medium 706 may also be used for storing data that is manipulated by processing circuit 704 when executing software.

One or more processing circuits 704 in the processing system may execute software or software components. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. A processing circuit may perform the tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory or storage contents. Information, arguments, parameters, data, etc. may be passed, forwarded, or transmitted via any suitable means including memory sharing, message passing, token passing, network transmission, etc.

The software may reside on machine-readable medium 706. The machine-readable medium 706 may be a non-transitory machine-readable medium. A non-transitory processing circuit-readable, machine-readable or computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), RAM, ROM, a programmable ROM (PROM), an erasable PROM (EPROM), an electrically erasable PROM (EEPROM), a register, a removable disk, a hard disk, a CD-ROM and any other suitable medium for storing software and/or instructions that may be accessed and read by a machine or computer. The terms "machine-readable medium", "computer-readable medium", "processing circuit-readable medium" and/or "processor-readable medium" may include, but are not limited to, non-transitory media such as portable or fixed storage devices, optical storage devices, and various other media capable of storing, containing or carrying instruction(s) and/or data. Thus, the various methods described herein may be fully or partially implemented by instructions and/or data that may be stored in a "machine-readable medium," "computer-readable medium," "processing circuit-readable medium" and/or "processor-readable medium" and executed by one or more processing circuits, machines and/or devices. The machine-readable medium may also include, by way of example, a carrier wave, a transmission line, and any other suitable medium for transmitting software and/or instructions that may be accessed and read by a computer.

The machine-readable medium 706 may reside in the processing system 714, external to the processing system 714, or distributed across multiple entities including the processing system 714. The machine-readable medium 706 may be embodied in a computer program product. By way of example, a computer program product may include a machine-readable medium in packaging materials. Those skilled in the art will recognize how best to implement the described functionality presented throughout this disclosure depending on the particular application and the overall design constraints imposed on the overall system.

One or more of the components, steps, features, and/or functions illustrated in the figures may be rearranged and/or combined into a single component, block, feature or function or embodied in several components, steps, or functions. Additional elements, components, steps, and/or functions may also be added without departing from the disclosure. The apparatus, devices, and/or components illustrated in the Figures may be configured to perform one or more of the methods, features, or steps described in the Figures. The algorithms described herein may also be efficiently implemented in software and/or embedded in hardware.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the following detailed description are presented in terms of algorithms and symbolic representations of operations on data bits within a computer memory. These algorithmic descriptions and representations are the methods used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared or otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following disclosure, it is appreciated that throughout the disclosure terms such as "processing," "computing," "calculating," "determining," "displaying" or the like, refer to the action and processes of a computer system, or similar electronic computing device, that manipulates and transforms data represented as physical (electronic) quantities within the computer system's registers and memories into other data similarly represented as physical quantities within the computer system's memories or registers or other such information storage, transmission or display.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. It will be appreciated that a variety of programming languages may be used to implement the teachings of the invention as described herein.

The figures and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures to indicate similar or like functionality.

The foregoing description of the embodiments of the present invention has been presented for the purposes of illustration and description. It is not intended to be exhaustive or to limit the present invention to the precise form disclosed. Many modifications and variations are possible in light of the above teaching. It is intended that the scope of the present invention be limited not by this detailed description, but rather by the claims of this application. As will be understood by those familiar with the art, the present invention may be embodied in other specific forms without departing from the spirit or essential characteristics thereof. Likewise, the particular naming and division of the modules, routines, features, attributes, methodologies and other aspects are not mandatory or significant, and the mechanisms that implement the present invention or its features may have different names, divisions and/or formats.

Furthermore, as will be apparent to one of ordinary skill in the relevant art, the modules, routines, features, attributes, methodologies and other aspects of the present invention can be implemented as software, hardware, firmware or any combination of the three. Also, wherever a component, an example of which is a module, of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming.

Additionally, the present invention is in no way limited to implementation in any specific programming language, or for any specific operating system or environment. Accordingly, the disclosure of the present invention is intended to be illustrative, but not limiting, of the scope of the present invention, which is set forth in the following claims.

The invention claimed is:

1. A system for performing quality control on a physical dentition model, the system comprising:
    a fabrication module selected from the group comprising an injection molding system, a lathing and milling system, or a 3D printing system, the fabrication module configured to manufacture a physical dentition model that is based upon a virtual model of a patient's dentition;
    a dentition model scanner configured to scan the physical dentition model to thereby obtain a scanned model; and
    a quality control module comprising a processor and a non-transitory computer-readable storage medium comprising instructions executable by the processor to determine whether the manufactured physical dentition model is a good or a defective product based on a statistical characteristic of a differences model generated by comparing spatial points of the virtual model of the patient's dentition and corresponding best-fitting points of the scanned model to compile offsets between the spatial points of the virtual model and the corresponding best-fitting spatial points of the scanned model.

2. The system of claim 1, wherein the quality control module is configured to determine whether a dental prosthesis is a good or defective product by determining a standard deviation of a difference value of points in the differences model.

3. The system of claim 1, wherein the quality control module is configured to generate the differences model using only data corresponding to a tooth.

4. The system of claim 1, wherein the quality control module is configured to generate the differences model using data corresponding to a dentition fixture, wherein the dentition fixture is a structure of the manufactured physical dentition model that is not associated with teeth and gum structures.

5. The system of claim 1, wherein the fabrication module comprises a 3D printing module configured to print the physical dentition model having a base, a hinge, and dentition structures, wherein the dentition structures comprise one or more teeth and gum structures, wherein the base is configured to support the dentition structures, and the hinge is configured to be pivotably attached to an opposing physical dentition model that when mated with the physical dentition model simulates a bite.

6. The system of claim 1, wherein the fabrication module comprises an injection molding system.

7. The system of claim 1, wherein the fabrication module comprises a mill.

8. The system of claim 1, wherein the physical dentition model comprises a recess between a pair of tooth structures, wherein the recess is a slot in the physical dentition model that extends beyond where a gum line starts by a predetermined depth.

9. The system of claim 8, wherein the predetermined depth has a range between 5% to 75% of a total thickness of gum between the pair of tooth structures.

10. The system of claim 8, wherein the predetermined depth has a range of 45% of the total thickness of the gum between the pair of tooth structures.

11. The system of claim 1, wherein the quality control module is configured to determine whether the physical dentition model is a good or a defective product further comprises determining the physical dentition model is a good product when all offsets within ±50 microns account for greater than 85% of all points in the differences model.

12. The system of claim 1, wherein the quality control module is configured to determine whether the physical dentition model is a good or a defective product further comprises determining the physical dentition model is a good product when all offsets greater than ±75 microns account for less than 1% of all points in the differences model.

13. The system of claim 1, wherein the quality control module is configured to determine whether the physical dentition model is a good or a defective product further comprises determining that the physical dentition model is too small or too large based on a distribution of differences that is negatively or positively biased as compared to a normal distribution.

14. The system of claim 1, wherein the physical dentition model comprises a 3D printed model.

* * * * *